Jan. 29, 1963 R. O. MURDOCH ET AL 3,076,078

THERMAL RELAY DEVICE

Filed Jan. 15, 1960 2 Sheets-Sheet 1

INVENTOR.
RICHARD O. MURDOCH
FRANK A. RECORD
BY Edgar O. Rost
ATTORNEY

Jan. 29, 1963 R. O. MURDOCH ET AL 3,076,078

THERMAL RELAY DEVICE

Filed Jan. 15, 1960 2 Sheets-Sheet 2

INVENTORS
RICHARD O. MURDOCH
FRANK A. RECORD
BY
Edgar O. Rost
ATTORNEY

United States Patent Office
3,076,078
Patented Jan. 29, 1963

3,076,078
THERMAL RELAY DEVICE

Richard O. Murdoch, Albuquerque, N. Mex., and Frank A. Record, Danvers, Mass.; said Murdoch assignor, by mesne assignments, to the United States of America as represented by the United States Atomic Energy Commission, and said Record assignor to Bomac Laboratories Inc., Beverly, Mass., a corporation of Massachusetts Filed Jan. 15, 1960, Ser. No. 2,764
4 Claims. (Cl. 200—117)

The present invention relates to thermal relay devices and more particularly to an improved electromechanical hermetically sealed reliable one shot switch for use in a wire range of environmental conditions including temperature, vibration and shock.

Devices of the character specifically described herein are employed in electrical circuits to either close a normally open circuit and/or to open a normally closed circuit to thereby activate other electrical components. High reliability is essential and since a plurality of such devices may be employed in electronic or electrical equipment, size and weight are important factors for consideration. In addition, present day demands in the usage of electronic and electrical equipments have introduced new standards for performance, including severe shock, vibration and acceleration, as well as, sudden and extreme temperature variations.

It is, accordingly, an object of the present invention to provide a reliable thermal relay device capable of performing under severe adverse environmental conditions.

A further object is to provide an improved thermal relay device that is miniaturized and ruggedized and also capable of reliable one shot operation after long periods of storage or stand-by operational use.

Briefly, the invention comprises a relay structure mounted within an envelope which provides a hermetically sealed and vacuum tight enclosure to protect the components from corrosion. The relay mechanism is conveniently provided with all external lead structure extending from only one side to thereby simplify circuit connections and also facilitate use of printed circuits. A plurality of contact leads are provided with paired sets being connected to various circuits with a shorting bar under tension disposed therebetween. One set of leads are contacted by the shorting bar to complete a circuit prior to release of the tension means, which in turn results in contact of another set of leads to close another circuit. The transfer time necessary to move the shorting bar between the contact leads is under one millisecond. The embodiment of the invention features low contact resistance between the components as well as the use of inorganic materials throughout to further eliminate the corrosion factors. In addition, the current potential difference between the closed and open circuits may be as high as 1500 volts without arcing occurring between the contact terminals.

Further objects, features and advantages will be evident after consideration of the following detailed specification and the accompanying drawings, in which.

Figure 1:
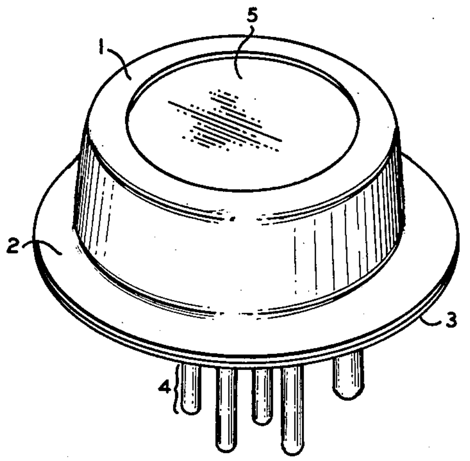
FIG. 1 is an enlarged perspective view of the illustrative embodiment.
Figure 2:
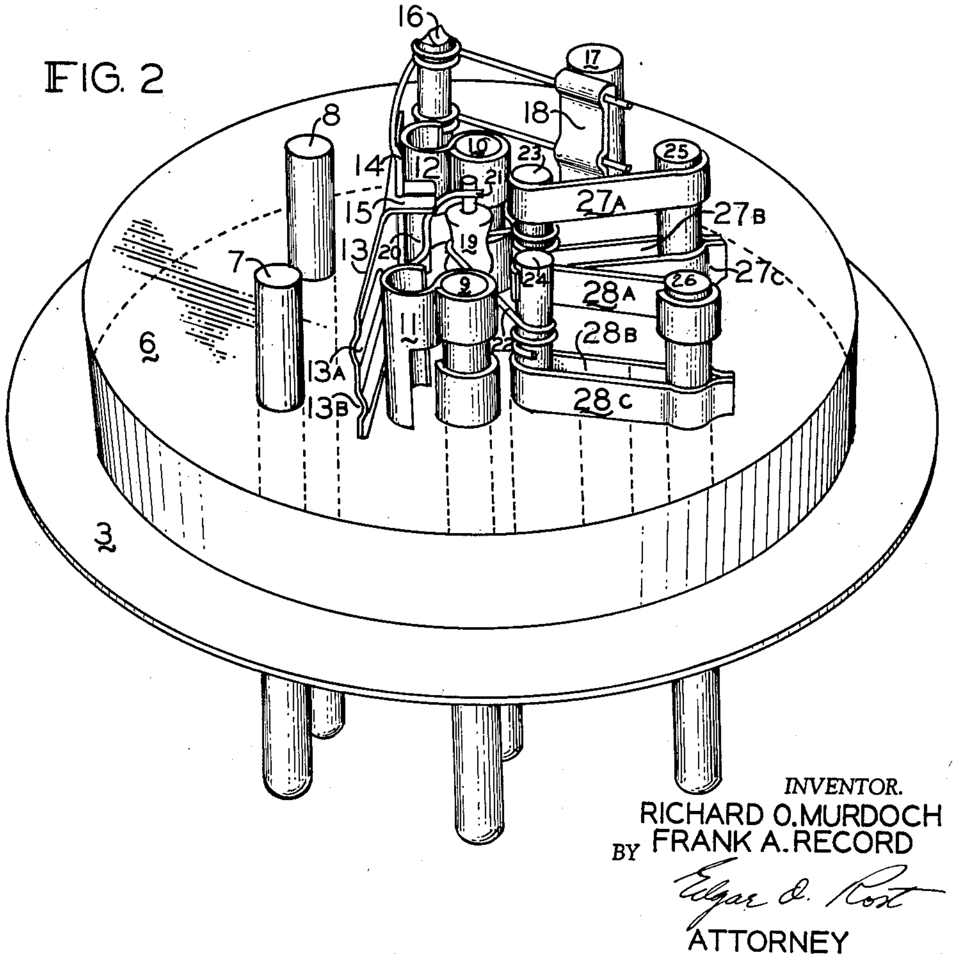
FIG. 2 is an enlarged perspective view of the illustrative embodiment with the cover removed.

Referring to the drawing, FIGS. 1 and 2 show the overall thermal relay device comprising an enclosure member 1 defining a flanged section 2 abutting the rim 3 of the body asembly having a plurality of leads, indicated generally by numeral 4, extending outwardly therefrom. Enclosure member 1 is shown with a viewing window 5 to provide for visible inspection of the internal relay mechanism to ascertain the functionality of the device before mounting same in associated circuitry. While such viewing means may be desirable, in certain applications a solid enclosure member will be preferred, particularly at higher environmental temperatures.

The components of the body assembly are supported by means of an insulating header assembly 6 sealed within rim 3. Spaced contact leads 7 and 8 form the open circuit connections while contact leads 9 and 10 form the closed circuit connections. Secured to leads 9 and 10 are S-shaped resilient contact members 11 and 12 which are contacted in the loaded or unfired condition by shorting bar 13 having convoluted contact surfaces 13*a* and 13*b*. Support means for the shorting bar 13 are provided by a substantially rigid spring member 14 having a portion thereof extending through and contacting a split tab 15 joined or formed at the top and bottom edges of the shorting bar. The spring is coiled at an intermediate point and looped over a post 16 secured to header assembly 6. The other end is secured to a support post 17 by means of a metallic tab 18 secured thereto as by spot welding. By means of the aforementioned supporting arrangement the shorting bar 13 is loosely coupled for ease and speed of movement and is also under tension by means of the spring-loading when the remaining structure to be described is assembled.

An insulator 19, illustrated as spool-shaped, is secured to one side of shorting bar 13 by wire members 20 and 21. A fusible wire 22 extends around insulator 19 and is secured by several turns and welding the ends thereof to pins 23 and 24 which are in turn supported by leads 25 and 26 connected thereto by rigid metallic tabs 27*a*, *b* and *c* and 28*a*, *b* and *c*. Leads 25 and 26 extend through the header assembly 6 for connection to a suitable current source to burn out the wire.

Figure 3:
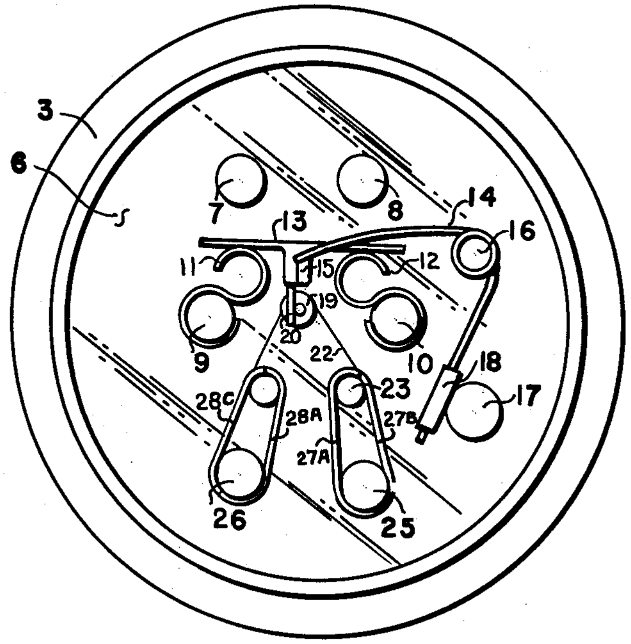
FIG. 3 is a top view of the relay mechanism of the invention in the closed or unfired position.
Figure 4:
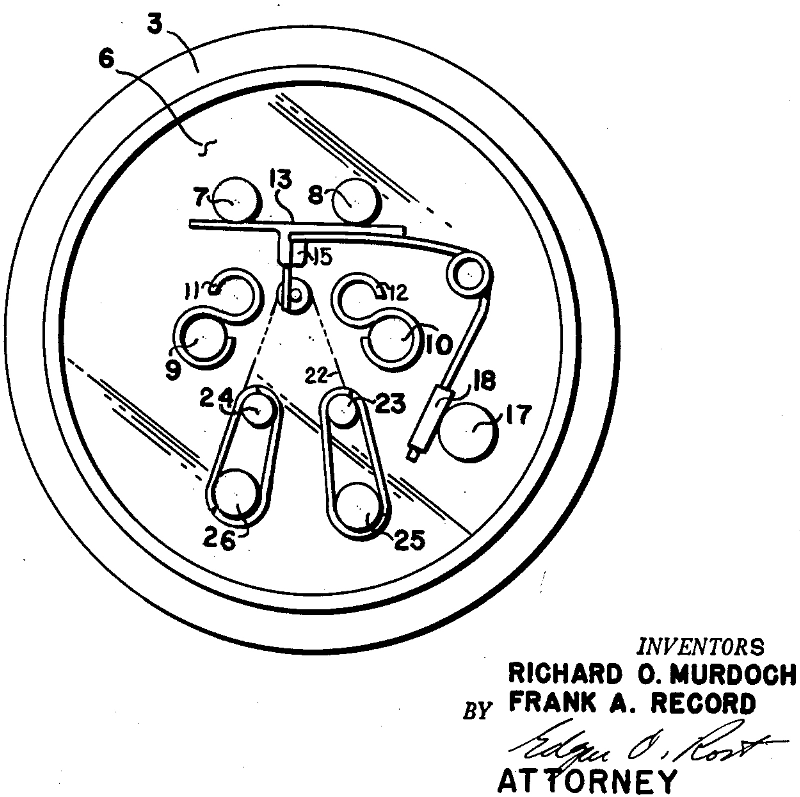
FIG. 4 is a top view similar to FIG. 3 showing the open or fired position.

FIG. 3 shows the open or unfired position with the fusible wire 22 holding the shorting bar 13 in contact members 11 and 12. Upon burn out of the fusible wire, as shown in FIG. 4, the shorting bar now moves into contact with leads 7 and 8 to thereby activate another circuit connected thereto and break a circuit connected through contact members 11 and 12. The force of spring 14 which is held under approximately twenty-one ounce tension assures rapid closing of the shorting bar with an actual embodiment having a measured transfer time of 750 microseconds.

The materials found to be desirable for the environmental requirements include a tungsten spring 14 with the ends secured by nickel tabs 18. The shorting bar 13 may be formed from molybdenum and is gold plated for improved electrical contact. Insulator 19 may be a ceramic material and contact members 11 and 12 are formed from nickel and may also be gold plated. The fusible wire may be selected from the material available commercially under the name Karma. Body rim 3 and envelope 1 may be formed from a nickel-cobalt-iron alloy metal having a coefficient of expansion approximately equal to that of glass. An embodiment of the invention has been operated after exposure to temperatures up to 900° F. and shocks of 2000G together with vibrations of 50G at 2000 cycles. Where necessary, operating temperatures up to 1500° F. may be achieved by replacing the glass header assembly 6 with a ceramic material.

Various modifications will be evident to artisans skilled in the art and it is our intention to include such modifications as fall within the spirit and scope of the invention as defined in the appended claims:

We claim:

1. An electromechanical thermal relay device comprising a main body assembly having a plurality of electrical leads extending from one side thereof, first and second paired sets of said leads being oppositely disposed, said first pair of leads defining a normally open circuit, a metallic shorting member disposed in contact with said second set of said leads by mechanical tensioning means controlled by fusible means to define a normally closed circuit, said fusible means having a third paired set of leads for external circuit connections, said shorting member being rapidly released to contact said first of leads when said fusible means are severed by passage of an electrical current pulse through said third set of leads to thereby close the normally open circuit and open the normally closed circuit and a metallic enclosure member hermetically sealed to said body assembly to define a vacuum tight envelope.

2. An electromechanical thermal relay device comprising a main body assembly having a rim section and a centrally disposed dielectric header enclosure joined thereto, a plurality of spaced electrical leads extending through said header enclosure, first and second paired sets of said leads being oppositely disposed, said first pair of leads defining a normally open circuit, a metallic shorting member disposed parallel to said leads and contacting said second set of leads by mechanical tensioning means supported by said header enclosure to define a normally closed circuit, said tensioning means being controlled by a fusible wire connected to a third paired set of leads, said shorting member rapidly moving into contact with the first set of leads when said fusible wire is severed by the passage of an electrical current pulse through said third set of leads to thereby close the normally open circuit and open the normally closed circuit and a metallic enclosure member hermetically sealed to said rim section.

3. An electromechanical thermal relay device according to claim 2 wherein said shorting bar is provided with at least one convoluted planar section on each side thereof to assure reliable electrical contact with said leads.

4. An electromechanical thermal relay device according to claim 2 wherein all components are fabricated of inorganic materials to provide long shelf life.

References Cited in the file of this patent

UNITED STATES PATENTS

| | | |
|---|---|---|
| 1,521,176 | Frank | Dec. 30, 1924 |
| 2,934,625 | Patrichi | Apr. 26, 1960 |

FOREIGN PATENTS

| | | |
|---|---|---|
| 464,852 | France | Jan. 23, 1914 |

UNITED STATES PATENT OFFICE

CERTIFICATE OF CORRECTION

Patent No. 3,076,078 January 29, 1963

Richard O. Murdoch et al.

It is hereby certified that error appears in the above numbered patent requiring correction and that the said Letters Patent should read as corrected below.

Column 2, line 2, for "asembly" read -- assembly --; line 43, after "contact" insert -- with contact --; column 3, line 14, after "first" insert -- set --.

Signed and sealed this 5th day of November 1963.

(SEAL)
Attest:

ERNEST W. SWIDER
Attesting Officer

EDWIN L. REYNOLDS
Acting Commissioner of Patents